US011911989B2

(12) United States Patent
Paul et al.

(10) Patent No.: US 11,911,989 B2
(45) Date of Patent: Feb. 27, 2024

(54) PRESS FRAME ASSEMBLY

(71) Applicant: Promess, Inc., Brighton, MI (US)

(72) Inventors: Cole D. Paul, Novi, MI (US); Matthew R. Rall, Howell, MI (US); Andrew H. Joseph, Milford, MI (US); Glenn W. Nausley, Jr., Howell, MI (US)

(73) Assignee: Promess, Inc., Brighton, MI (US)

( * ) Notice: Subject to any disclaimer, the term of this patent is extended or adjusted under 35 U.S.C. 154(b) by 260 days.

(21) Appl. No.: 17/420,932

(22) PCT Filed: Nov. 15, 2019

(86) PCT No.: PCT/US2019/061647

§ 371 (c)(1),
(2) Date: Jul. 6, 2021

(87) PCT Pub. No.: WO2020/131261

PCT Pub. Date: Jun. 25, 2020

(65) Prior Publication Data

US 2022/0063226 A1 Mar. 3, 2022

Related U.S. Application Data

(60) Provisional application No. 62/781,696, filed on Dec. 19, 2018.

(51) Int. Cl.
*B30B 15/28* (2006.01)
*B21C 51/00* (2006.01)
(Continued)

(52) U.S. Cl.
CPC ............ *B30B 15/281* (2013.01); *B21C 51/00* (2013.01); *B30B 15/0094* (2013.01);
(Continued)

(58) Field of Classification Search
CPC . B30B 15/0041; B30B 15/0094; B30B 15/04; B30B 15/041; B30B 15/042;
(Continued)

(56) References Cited

U.S. PATENT DOCUMENTS 2,937,734 A 5/1960 Sommer
3,365,689 A * 1/1968 Kutsay .................. G01L 1/2231
73/862.632

(Continued)

FOREIGN PATENT DOCUMENTS

JP 2001071196 A * 3/2001 ............. B30B 1/186
KR 20010097966 A * 11/2001

OTHER PUBLICATIONS

International search report for an international application No. PCT/US 19/61647 dated Jan. 29, 2020.

*Primary Examiner* — Katrina M Stransky
*Assistant Examiner* — P Derek Pressley
(74) *Attorney, Agent, or Firm* — Quinn IP Law

(57) ABSTRACT

A press frame assembly includes a base plate, a load cell, and an overload protection element; a first plate, a plurality of guideposts disposed on the base plate; a plurality of springs disposed on the plurality of guideposts, a displacement transducer arranged to monitor a linear displacement of the first plate, and a controller, in communication with the load cell and the displacement transducer. The first plate is disposed to translate on the plurality of guideposts, and wherein the springs are disposed to urge movement of the first plate in relation to the base plate. The load cell is arranged to monitor a load exerted upon the base plate. The controller generates a signal that is based upon the load exerted upon the base plate or the linear displacement of the first plate in relation to the base plate.

20 Claims, 6 Drawing Sheets

(51) Int. Cl.

| | |
|---|---|
| ***B21J 13/04*** | (2006.01) |
| ***B30B 1/24*** | (2006.01) |
| ***B30B 15/00*** | (2006.01) |
| ***B30B 15/04*** | (2006.01) |
| ***B30B 15/26*** | (2006.01) |

(52) U.S. Cl.
CPC .............. *B30B 15/04* (2013.01); *B30B 15/26* (2013.01); *B21J 13/04* (2013.01); *B30B 1/24* (2013.01)

(58) Field of Classification Search
CPC ....... B30B 15/14; B30B 15/148; B30B 15/26; B30B 15/28; B30B 15/281; B30B 15/282; G01L 5/0076; G01L 5/0085
USPC .......................................................... 100/265
See application file for complete search history.

(56) References Cited

U.S. PATENT DOCUMENTS

| | | | | |
|---|---|---|---|---|
| 3,765,322 | A | 10/1973 | Weyer | |
| 4,274,282 | A | 6/1981 | Budraitis et al. | |
| 4,491,027 | A * | 1/1985 | Yalof | G01L 5/0076 73/862.52 |
| 5,941,111 | A * | 8/1999 | Skala | B21D 37/00 72/21.4 |
| 2004/0231397 | A1 * | 11/2004 | Faitel | B30B 15/04 72/454 |
| 2006/0193938 | A1 | 8/2006 | Yukio et al. | |
| 2013/0319135 | A1 * | 12/2013 | Okada | G01L 1/2206 73/862.043 |
| 2017/0368592 | A1 | 12/2017 | Takao | |
| 2018/0304569 | A1 | 10/2018 | Gamlen et al. | |

* cited by examiner

PRESS FRAME ASSEMBLY

CROSS-REFERENCE TO RELATED APPLICATIONS

This application claims the benefit of U.S. Provisional Patent Application No. 62/781,696 filed on Dec. 19, 2018, the disclosure of which is hereby incorporated by reference.

TECHNICAL FIELD

The concepts described herein are related to press frame assembly devices that may be employed in press assembly of workpieces.

INTRODUCTION

A press is a device that is employed in a manufacturing environment to execute one or more manufacturing or assembly steps on a workpiece. A press provides a mounting structure for a press-assembly tool, which focuses a compression force being exerted on or by the press to perform a press-assembly action, such as crimping, press-fitting, staking, riveting, lid-closing, etc. A press and accompanying press-assembly tool can be configured to operate on a range of products, including wire terminals, bearings, plastics, etc.

Issues related to manufacturing or assembly steps executed by a press include consistency and uniformity of exerted pressure from the press onto the workpiece via the press-assembly tool, which may affect workpiece quality, part-to-part variability and tooling wear. Such information may also be useful in determining tooling maintenance schedules.

SUMMARY

A press frame assembly is described, and is a portable, reconfigurable, self-contained device that may be inserted into a mechanical press, wherein the mechanical press is capable of cyclically executed compression and expansion strokes. The press frame assembly is configured to mount elements of a press-assembly tool to act upon workpieces during the cyclically executed compression and expansion strokes.

An embodiment of the press frame assembly includes a base plate, including a second press-tool mount, a load cell, and an overload protection element; a first plate, including a first press-tool mount, wherein the first plate defines a first plane that is arranged in parallel to a second plane defined by the base plate; a plurality of guideposts disposed on the base plate; a plurality of springs disposed on the plurality of guideposts; a displacement transducer, wherein the displacement transducer is arranged to monitor a linear displacement of the first plate in relation to the base plate; and a controller, in communication with the load cell and the displacement transducer. The first plate is disposed to translate on the plurality of guideposts, and wherein the springs are disposed to urge movement of the first plate in relation to the base plate. The load cell is arranged to monitor a load exerted upon the base plate. The controller generates a signal that is based upon the load exerted upon the base plate or the linear displacement of the first plate in relation to the base plate.

An aspect of the disclosure includes an electrical connector in communication with the controller, wherein the controller is configured to monitor signal outputs from the displacement transducer and the load cell and communicate a signal to the electrical connector based thereon.

Another aspect of the disclosure includes a visual indicator in communication with the controller, wherein the controller is arranged to activate the visual indicator based upon at least one of the load exerted upon the base plate by the translation of the first plate and the linear displacement of the first plate in relation to the base plate.

Another aspect of the disclosure includes the second press-tool mount of the base plate and the first press-tool mount of the first plate being arranged to mount the elements of the press-assembly tool.

Another aspect of the disclosure includes the press-assembly tool including first and second elements, wherein the second press-tool mount of the base plate is configured to mount the first element of the press-assembly tool, and wherein the first press-tool mount of the first plate is configured to mount the second element of the press-assembly tool.

Another aspect of the disclosure includes the displacement transducer being one of a resistive potentiometer, a linearly-variable differential transformer (LVDT), an inductive device, an encoder, or a laser device that is arranged to monitor a linear displacement of the first plate in relation to the base plate.

Another aspect of the disclosure includes the load cell including a beam portion and a flexure portion, and the overload protection element being disposed on the beam of the load cell and arranged to overlap with the base plate.

Another aspect of the disclosure includes the beam portion and the flexure portion of the load cell being formed in the base plate, wherein the overload protection element includes a second press-tool mount and a shim interposed between the beam portion of the load cell and the second press-tool mount.

Another aspect of the disclosure includes the overload protection element being arranged to provide a mechanical stop to a deflection of the load cell in response to a compression force.

Another aspect of the disclosure includes the overload protection element being arranged to provide a mechanical stop to a deflection of the load cell in response to a tension force.

Another aspect of the disclosure includes the shim and the beam of the load cell cooperating with the base plate to define a maximum deflection of the load cell.

Another aspect of the disclosure includes the base plate including an aperture, and a spacer inserted into the aperture formed in the base plate, wherein the spacer has a thickness that is greater than a thickness of the base plate.

Another aspect of the disclosure includes the load cell being a disc including a beam portion and a flexure portion, wherein the load cell is fixedly attached to a lower portion of the base plate and circumscribes the aperture, and wherein the overload protection element includes a second press-tool mount disposed on an upper surface of the base plate including the spacer such that the spacer is interposed between the beam portion of the load cell and the second press-tool mount.

Another aspect of the disclosure includes the spacer and the beam of the load cell cooperating with the base plate to define a maximum deflection of the load cell.

Another aspect of the disclosure includes the load cell including a plurality of transducers that are disposed on the flexure portion.

Another aspect of the disclosure includes the plurality of transducers being strain-gage transducers.

Another aspect of the disclosure includes the strain-gage transducers being electrically connected in a Wheatstone bridge arrangement.

Another aspect of the disclosure includes the plurality of guideposts being disposed on the base plate and orthogonal to the second plane, the first plate including a plurality of through-holes corresponding to the guideposts, wherein the guideposts are inserted into the plurality of through-holes.

Another aspect of the disclosure includes the press frame assembly being insertable into a mechanical press and configured to mount a press-assembly tool that is configured to act upon a workpiece.

Another aspect of the disclosure includes the controller including a memory device, wherein the controller is configured to monitor signal outputs from the load cell and the displacement transducer during each iteration of an assembly cycle, wherein the controller includes an instruction set stored in the memory device, the instruction set executable to analyze the signal outputs from the load cell and the displacement transducer during each iteration of the assembly cycle, store the analyzed signal outputs in the memory device, and communicate the analyzed signal outputs to a second device.

Another aspect of the disclosure includes the mechanical press including a linear actuator disposed to exert a displacement force on the first press-tool mount.

Another aspect of the disclosure includes the linear actuator being disposed to exert a compression displacement force on the first press-tool mount.

Another aspect of the disclosure includes the linear actuator being disposed to exert a tension force on the first press-tool mount.

Another aspect of the disclosure includes the load cell being disposed to monitor load exerted upon second press-tool mount by the mechanical press and including the load cell being disposed to monitor load exerted upon the workpiece.

Another aspect of the disclosure includes a press frame assembly including a first plate, including a second press-tool mount; a base plate, including a first press-tool mount, a load cell, and an overload protection element; a plurality of guideposts disposed on the base plate and arranged to guide translation of the first plate in relation to the base plate; and a displacement transducer that is arranged to monitor the translation of the first plate in relation to the base plate. The load cell is arranged to monitor a load exerted upon the base plate that is associated with the translation of the first plate in relation to the base plate.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid obscuring the disclosure. For purposes of convenience and clarity only, directional terms such as top, bottom, left, right, upper, lower, above, below, beneath, rear, front, etc., may be used with respect to the drawings. These and similar directional terms are not to be construed to limit the scope of the disclosure. Furthermore, the disclosure, as illustrated and described herein, may be practiced in the absence of an element that is not specifically disclosed herein. The disclosure may further include hardware that is not illustrated in the Figures, but is nonetheless contemplated herein.

Figure 1:
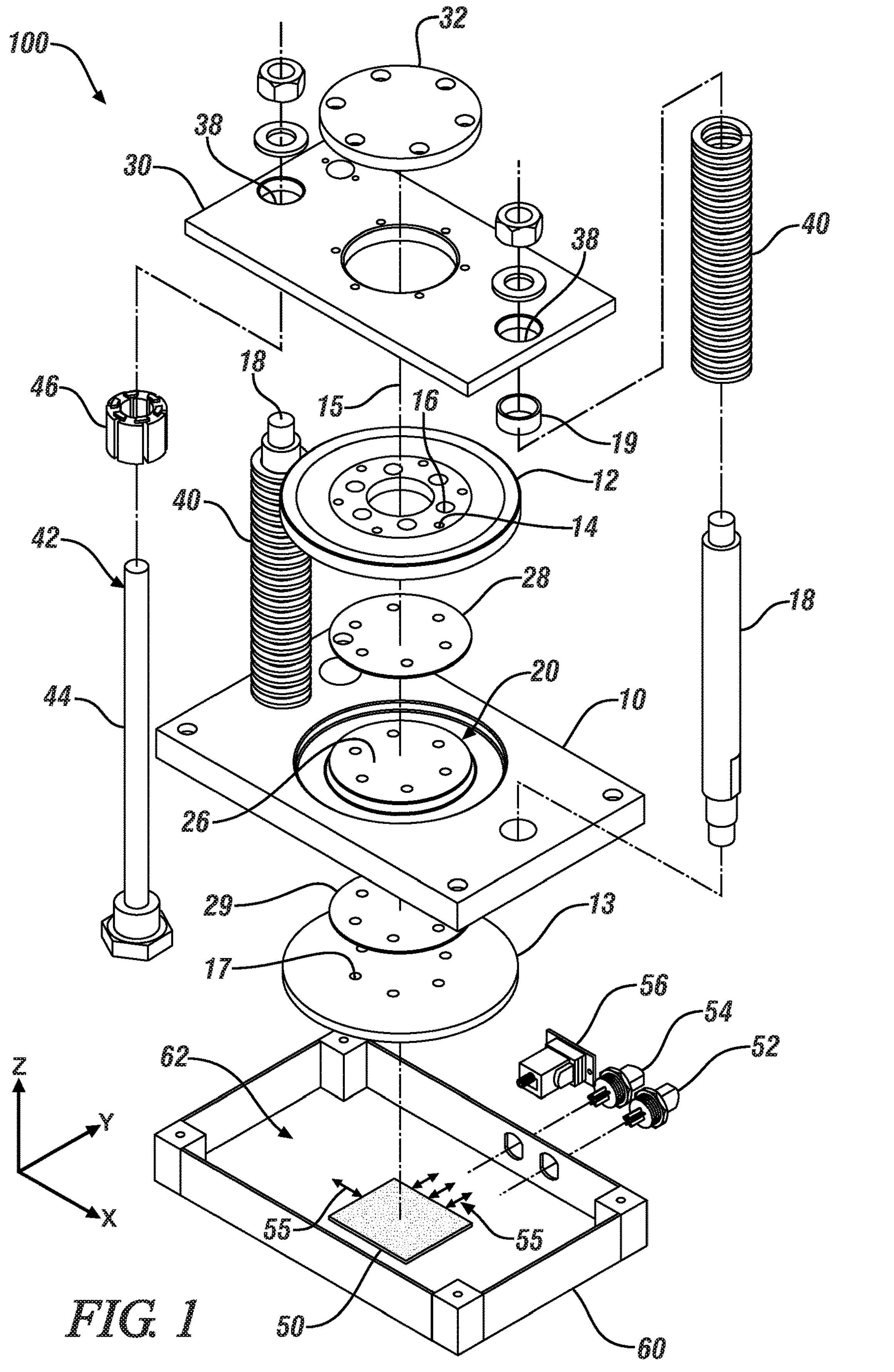
FIG. 1 schematically illustrates an exploded isometric view of an embodiment of a press frame assembly, in accordance with the disclosure.
Figure 2:
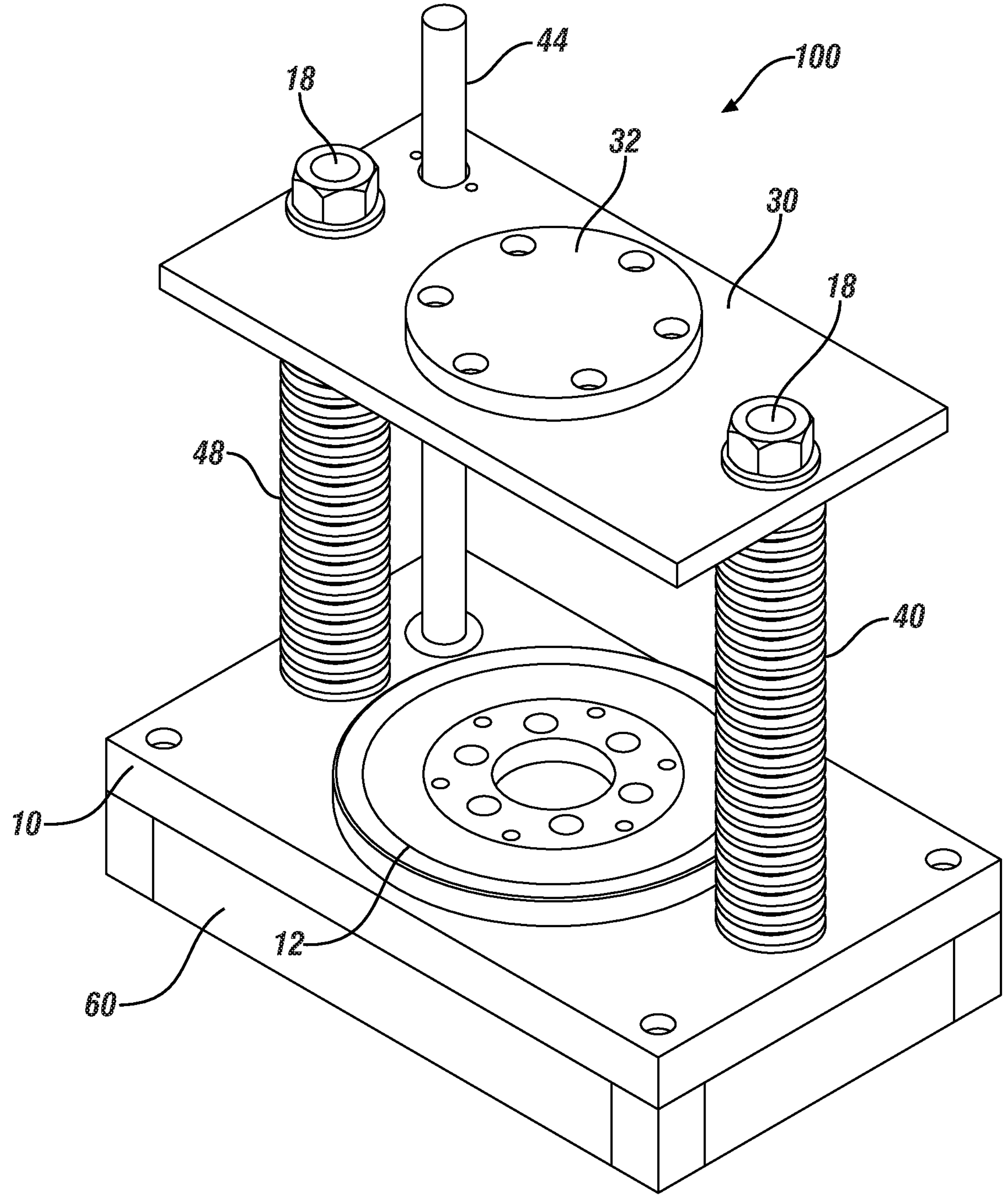
FIG. 2 schematically illustrates an isometric view of an embodiment of a press frame assembly, in accordance with the disclosure.
Figure 3:
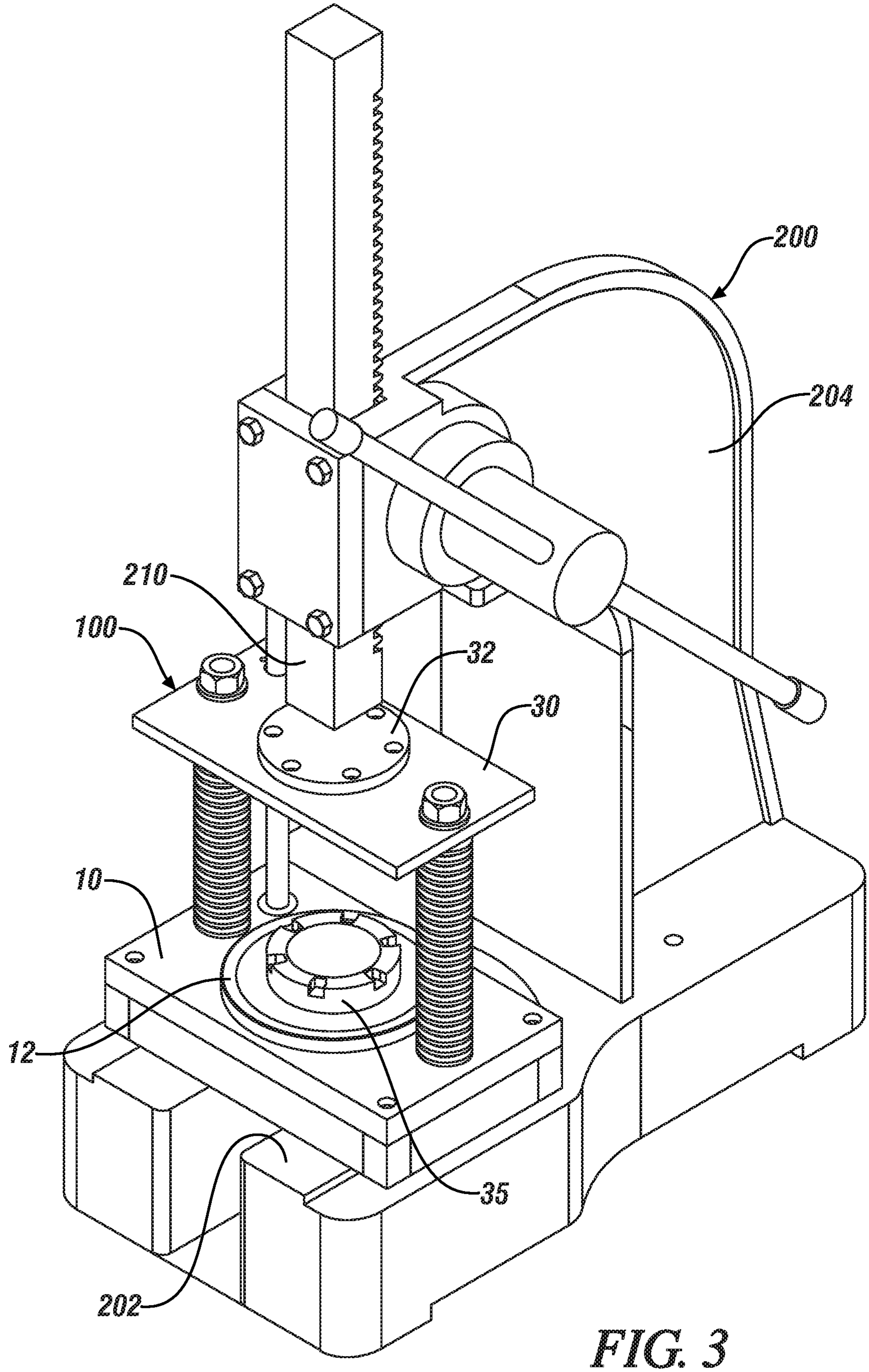
FIG. 3 schematically illustrates an isometric view of an embodiment of a press frame assembly disposed in a mechanical press, in accordance with the disclosure.
Figure 4:
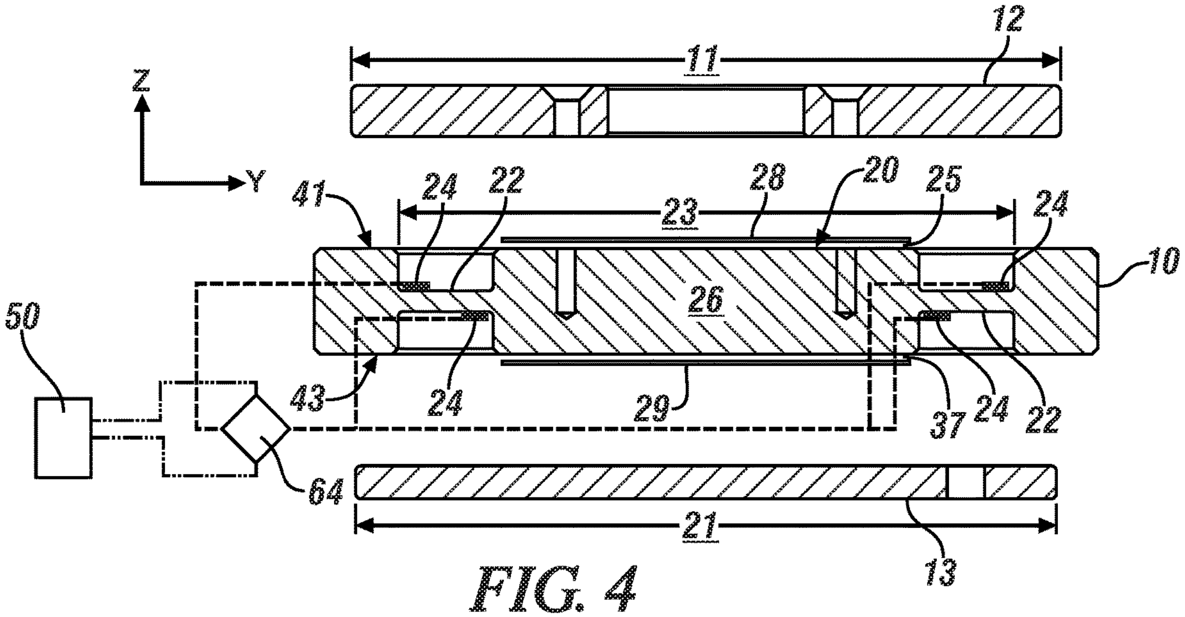
FIG. 4 schematically illustrates an exploded cutaway side-view of a portion of a base of an embodiment of a press frame assembly, in accordance with the disclosure.

Referring now to the drawings, wherein the depictions are for the purpose of illustrating certain exemplary embodiments only and not for the purpose of limiting the same, FIGS. 1-4 schematically illustrate an embodiment of a press frame assembly 100 in the form of a portable, modular, integrated, self-contained unit that is insertable into a mechanical press 200, wherein the mechanical press 200 includes elements that are capable of performing repetitive, cyclical tasks that may include exerting compressive and/or tensile forces on the press frame assembly 100 to execute a manufacturing or assembly process on a workpiece. FIG. 3 schematically shows an embodiment of the press frame assembly 100 that is inserted into the mechanical press 200, which is an arbor press as shown and in one embodiment. The press frame assembly 100 is configured to provide mounting and position guidance for a press-assembly tool 35 that may include first, upper and second, lower press-tool elements. Like reference numerals correspond to like or similar components throughout the several Figures. As employed herein, the term "assembly" is employed and defined to describe the press frame 100 as being a single integrated entity. Thus, the press frame assembly 100 may be installed, removed, and transported as a single entity, which facilitates setup and teardown in a manufacturing environment. The press frame assembly 100 is advantageously configured to be inserted into a mechanical press tool, e.g., the mechanical press 200 shown with reference to FIG. 2, and operated with minimal or no additional mounting or fixturing. As such, the press frame assembly 100 can be deployed and operated without having to execute a shutdown of the mechanical press tool, thus facilitating rapid installation and rapid teardown operations. Instead, connections may be made to the electrical power connector 56 and/or the electrical communication connector 54, without any form of mechanical connection to the mechanical press tool. This facilitates a turn-key swap-out of different embodiments of the press frame assembly 100 that incorporate various embodiments of the press-assembly tool 35. The press-assembly tool 35 may be configured to execute any one of various press-tool operations, including, e.g., crimping, press-fitting, staking, riveting, lid-closing, etc.

Details of the press frame assembly 100 are described with reference to a three-dimensional coordinate system that includes an X-axis, a Y-axis and a Z-axis to provide a frame of reference. The press frame assembly 100 may be implemented with the Z-axis having a nominal vertical orientation (as shown) in one embodiment, although the concepts described herein are not so limited. The Z-axis may have a vertical orientation, a horizontal orientation, or another suitable orientation that meets the specific needs of implementation of an embodiment of the press frame assembly 100 in-use.

The press frame assembly 100 includes a base 10, a load cell 20, a first, upper plate 30 including a first press-tool mount 32, a second press-tool mount 12, vertically-oriented guideposts 18, springs 40, a linear displacement transducer 42, a controller 50, an electrical power connector 56, an electrical communication connector 54, and a visual indicator 52. In one embodiment, the load cell 20 is an integral portion of the base 10, as shown with reference to FIG. 4. The electrical communication connector 54 is in communication with the controller 50, and may be compatible with one or multiple communication protocols, including, e.g., Ethernet and/or EtherCAT protocols. The electrical power connector 56 is connected to the controller 50 and to a low-voltage power source to supply electric power to operate the controller 50. The electrical communication connector 54 and the electrical power connector 56 may be disposed in a single connector in one embodiment. A lower portion of the press frame assembly 100 includes the base 10 and a cover 60, which cooperate to define a cavity 62 in which the controller 50 is housed. The base 10 also provides apertures and mounting for the electrical power connector 56, the electrical communication connector 54 and the visual indicator 52, e.g., a lamp. The first and second press-tool mounts 12, 32 are arranged to provide mounting structure for the first and second press-tool elements of the press-assembly tool 35.

The base 10 may be fabricated from a flat block of steel or other hardened metal. The load cell 20 is an integral portion of the base 10 that is formed into the flat block of steel in one embodiment. The load cell 20 includes an annularly-shaped flexure portion 22 that circumscribes a disc-shaped beam 26, and one or a plurality of load sensors 24. The flexure portion 22 may be formed by machining an annular groove into an upper surface 41 of the base 10 and machining a correspondingly-located annular groove into a lower surface 43 of the base 10, employing a mill or another metal cutting device. A vertical thickness of the flexure portion 22 is uniform in the radial direction that is defined relative to the beam 26 in one embodiment. The vertical thickness of the flexure portion 22 is selected based upon an expected magnitude of force being exerted upon the beam 26 and an expected deflection of the beam 26 in response to an expected magnitude of exerted force upon the beam 26 that occurs during the cyclical operation of the mechanical press 200, and also accounts for a linear range of the load sensors 24 that are disposed to measure the deflection in the beam 26. An upper surface of the beam 26 is preferably flush with the upper surface 41 of the remaining portion of the base 10, and a lower surface of the beam 26 is preferably flush with the lower surface 43 of the remaining portion of the base 10, although other concepts may be employed.

The second press-tool mount 12 is a disk-shaped device that is attached to the top surface of the beam 26 of the load cell 20 with a first, upper shim 28 interposed therebetween. The second press-tool mount 12 has an outer diameter 11 that is greater than a corresponding outer diameter 23 of the annular groove of the flexure portion 22 of the beam 26 of the load cell 20. Thus, the base 10 provides a mechanical stop to the second press-tool mount 12 due to the outer diameter 11 of the second press-tool mount 12 being greater than the outer diameter 23 of the annular groove of the flexure portion 22 of the beam 26 of the load cell, which serves to provide compressive force overload protection to prevent overloading or overextension of the load cell 20. In one embodiment, the base 10 may include a tension overload protection plate 13 and a second, lower shim 29, wherein the second shim 29 is interposed between the tension overload protection plate 13 and a lower surface of the beam 26 of the load cell 20. The first and second shims 28, 29 are disc-shaped devices having pre-defined thicknesses to produce a respective first gap 25 and a second gap 37.

The second press-tool mount 12 further includes a first set of apertures 16 that are arranged to permit attachment of the second press-tool mount 12 to the top surface of the beam 26 of the load cell 20 employing fasteners, e.g., threaded screws, which attach to corresponding apertures in the top surface of the beam 26, with the first shim 28 interposed therebetween. The second press-tool mount 12 includes a set of tool fasteners 14, e.g., threaded apertures, which are arranged to permit attachment of the second press-tool elements thereto. The interposition of the first shim 28 causes the second press-tool mount 12 to be disposed from the base 10 at the first gap 25 when the press frame assembly 100 is in a relaxed, unloaded state, wherein the first gap 25 is determined by a thickness of the first shim 28.

The tension overload protection plate 13 is a disc-shaped device that includes a set of apertures 17 that are arranged to permit attachment to the lower surface of the beam 26 of the load cell 20 employing fasteners, e.g., threaded screws, which attach to corresponding apertures in the lower surface of the beam 26, with the second shim 29 interposed therebetween.

The tension overload protection plate 13 has an outer diameter 21 that is greater than the outer diameter 23 of the annular groove of the flexure portion 22 of the beam 26 of the load cell 20, and thus overlaps with the base plate 10. Thus, the base 10 provides a mechanical stop to the tension overload protection plate 13 due to the outer diameter 21 of the tension overload protection plate 13 being greater than the outer diameter 23 of the annular groove of the flexure portion 22 of the beam 26 of the load cell 20, which serves to provide tension force overload protection to prevent overloading or overextension of the flexure portion 22 of the load cell 20. The interposition of the second shim 29 causes the tension overload protection plate 13 to be disposed at the second gap 37 from the base 10 when the press frame assembly 100 is in the relaxed, unloaded state, wherein the second gap 37 is determined by a thickness of the second shim 29.

The tension overload protection plate 13, first and second shims 28, 29, first press-tool mount 32, second press-tool mount 12, the beam 26 of the load cell 20 and associated annular groove of the flexure portion 22 of the beam 26 are arranged coaxial to a centerline 15 that is parallel to the Z-axis in one embodiment.

The base 10 provides mounting apertures 16 that accommodate attachment of the guideposts 18, wherein each of the guideposts 18 projects vertically upward. Two guideposts 18 and associated bushings 19 are illustrated. Alternatively, any quantity of the guideposts 18 may be employed, including, e.g., a single guidepost 18, or three or more of the guideposts 18. Coil springs 40 may be disposed on the guideposts 18. As shown, two springs 40 are illustrated, and correspond to the two guideposts 18. Alternatively, a single coil spring 40 may be disposed on one of the guideposts 18 when two guideposts 18 are employed. Alternatively, any quantity of the springs 40 less than or equal to the quantity of guideposts 18 may be employed. By way of a non-limiting example, three guideposts 18 may be employed, with springs 40 disposed on only two of the guideposts 18. Each of the coil springs 40 is a compressible spring that is disposed on a respective one of the guideposts 18 between the base 10 and the first plate 30, and arranged to urge movement of the first plate 30 in relation to the base 10. Each of the guideposts 18 may have an adjustable length, permitting adjustment to a desired stroke length by controlling a distance of travel of the first plate 30 in use.

The base 10 provides mounting and accommodation for a post 44 of the linear displacement transducer 42, wherein the post 44 projects vertically upward. The linear displacement transducer 42 also includes a displacement sensor 46 that fixedly mounts on the first plate 30, thus permitting measurement of the linear displacement of the first plate 30 relative to the second press-tool mount 12 employing the linear displacement transducer 42. The linear displacement transducer 42 may be a resistive potentiometer, a linearly-variable differential transformer (LVDT), an inductive device, an encoder, a laser monitor, a triangulation device, or another technology. The post 44 includes electrical leads 48 that connect to an input port of the controller 50, thus enabling the controller 50 to monitor position of the displacement sensor 46, and thus monitor the position of the first plate 30.

The load cell 20 is arranged to monitor load exerted upon the second press-tool mount 12 by action of the mechanical press 200 when the first plate 30 is urged towards the base 10. The load cell 20 includes the plurality of load sensors 24, which are advantageously disposed on the flexure portion 22. In one embodiment, the load sensors 24 are resistive-type strain gages, or alternatively other devices that are disposed to measure mechanical stress on the flexure portion 22. The load sensors 24 may be located in the flexure portion 22 at positions of maximum flexure or stress, such as proximal to the junction with the beam 26 and proximal to the junction with the base 20. The load sensors 24 may be located around the annular portion, e.g., at 90 degree intervals or another set of intervals about the 360 degrees. Signal inputs from the load sensors 24 can be input to a signal processing device 64, e.g., a Wheatstone bridge, which can process the signal inputs to generate a voltage output that can be correlated to stress or deflection, and thus be correlated to load. The signal processing device 64 of the load cell 20 may be a stand-alone device, or may be integrated into the controller 50. The output of the signal processing device 64 is communicated to the controller 50 for monitoring and recording. Table 1 is included herein to provide a non-limiting example of a correlation of load to deflection, as follows. The correlation of load and deflection can be converted to a calibration, in the form of a table or an equation that is stored in the controller 50.

TABLE 1

| Load (kN) | Deflection (mm) |
|---|---|
| 3 | 0.0077 |
| 6 | 0.015 |
| 9 | 0.023 |
| 12 | 0.031 |
| 15 | 0.038 |

The action of the mechanical press 200 onto the press frame assembly 100 can induce deflection on the flexure portion 22, which can be measured employing the load sensors 24 and converted to a load parameter via an algorithm that includes a load/deflection calibration, such as is described with reference to Table 1. The algorithm and load/deflection calibration may reside in the controller 50. Each load parameter can be stored in a memory device accessible to the controller 50 for future review and/or control purposes.

The first plate 30 includes the first press-tool mount 32 that may provide mounting and position guidance for the first press-tool element of the press-assembly tool 35. The first plate 30 also includes through-holes 38 through which pass the guideposts 18, with bushings 19 interposed therebetween. The through-holes 38 correspond to respective ones of the guideposts 18 and the guideposts 18 are inserted therein and secured via nuts and washers that assembled onto threads on the guideposts 18, or via another mechanism such as a locking pin. The first plate 30 also includes a plurality of threaded apertures 36 for mounting and securing the first press-tool mount 32 via a threaded fastener or another fastening device. This arrangement permits a configuration wherein the first press-tool mount 32 can be readily changed out to effect a tooling change for the first press-tool element. The first press-tool mount 32 is configured to interact with a linear actuator 210 of the mechanical press 200. As shown, the first press-tool mount 32 is arranged in a plane that is parallel to a plane defined by the second press-tool mount 12. The first plate 30 is disposed to translate on the guideposts 18 in parallel with the base 10 and the second press-tool mount 12, and the springs 40 are disposed to urge the first plate 30 away from the second press-tool mount 12 and the base 10 in one embodiment. Alternatively, the first plate 30 may be disposed to translate on the guideposts 18 in parallel with the base 10 and the second press-tool mount 12, and the springs 40 are disposed to urge the first plate 30 towards the second press-tool mount 12 and the base 10 in one embodiment.

The displacement sensor 46 of the linear displacement transducer 42 is attached to the first plate 30 to monitor linear displacement thereof.

FIG. 3 illustrates an embodiment of the press frame assembly 100 that is disposed in an embodiment of the mechanical press 200, which is in the form of an arbor press.

The mechanical press 200 includes a press base 202 having a C-frame portion 204 that is connected to the linear actuator 210. The press frame assembly 100 is disposed with its base 10 seated on the press base 202 and with the linear actuator 210 of the mechanical press 200 disposed to exert a displacement force on the first press-tool mount 32 towards the press base 202. The displacement force may be a compressive force when moving the linear actuator 210 towards the press base 202 or a tensile force when moving the linear actuator 210 away from the press base 202.

The controller 50 may be disposed in the base 10, and includes an A/D converter, memory device(s), CPU, an instruction set (software), and a communication link 55. The controller 50 is connected to electrical lead lines of the linear displacement transducer 42 and the load cell 20, and is able to communicate via the electrical communication connector 54 and the visual indicator 52. The controller provides signal processing for signals from the load cell 20 and the linear displacement transducer 42, and stores any captured data. Captured data may include, by way of non-limiting examples, for each operating cycle of the mechanical press 200 acting upon a workpiece, a maximum press-fit force, a maximum press depth, a force realized at a distance relative to maximum press depth, and force/position profile. The controller 50 can be programmed to store a record associated with each cycle that is executed on a workpiece, and can be queried by a second, external controller to report out captured data. The controller 50 may communicate with the visual indicator 52 to indicate presence of electrical power, acceptability of a processed workpiece (e.g., GO/NO-GO), or other information. The controller 50 may visually indicate when a target force, position, elapsed time or another condition has been achieved each iteration. As such, the controller 50 is configured to perform signal conditioning of data that is acquired from the load cell 20 and the linear displacement transducer 42, data storage, and communications for stored data.

The term "controller" and related terms such as control module, module, control, control unit, processor and similar terms refer to one or various combinations of Application Specific Integrated Circuit(s) (ASIC), System on a Chip (SOC), Field-Programmable Gate Arrays (FPGAs), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link, all of which are indicated by the communication link 55. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, elapsed time or triggering events, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The terms "calibration", "calibrate", and related terms refer to a result or a process that compares an actual or standard measurement associated with a device with a perceived or observed measurement, or a commanded position. A calibration as described herein can be reduced to a storable parametric table, a plurality of executable equations or another suitable form. A parameter is defined as a measurable quantity that represents a physical property of a device or another element that is discernible using one or more sensors and/or a physical model. A parameter may have a discrete value, e.g., either "1" or "0", or may be infinitely variable in value.

Figure 5:
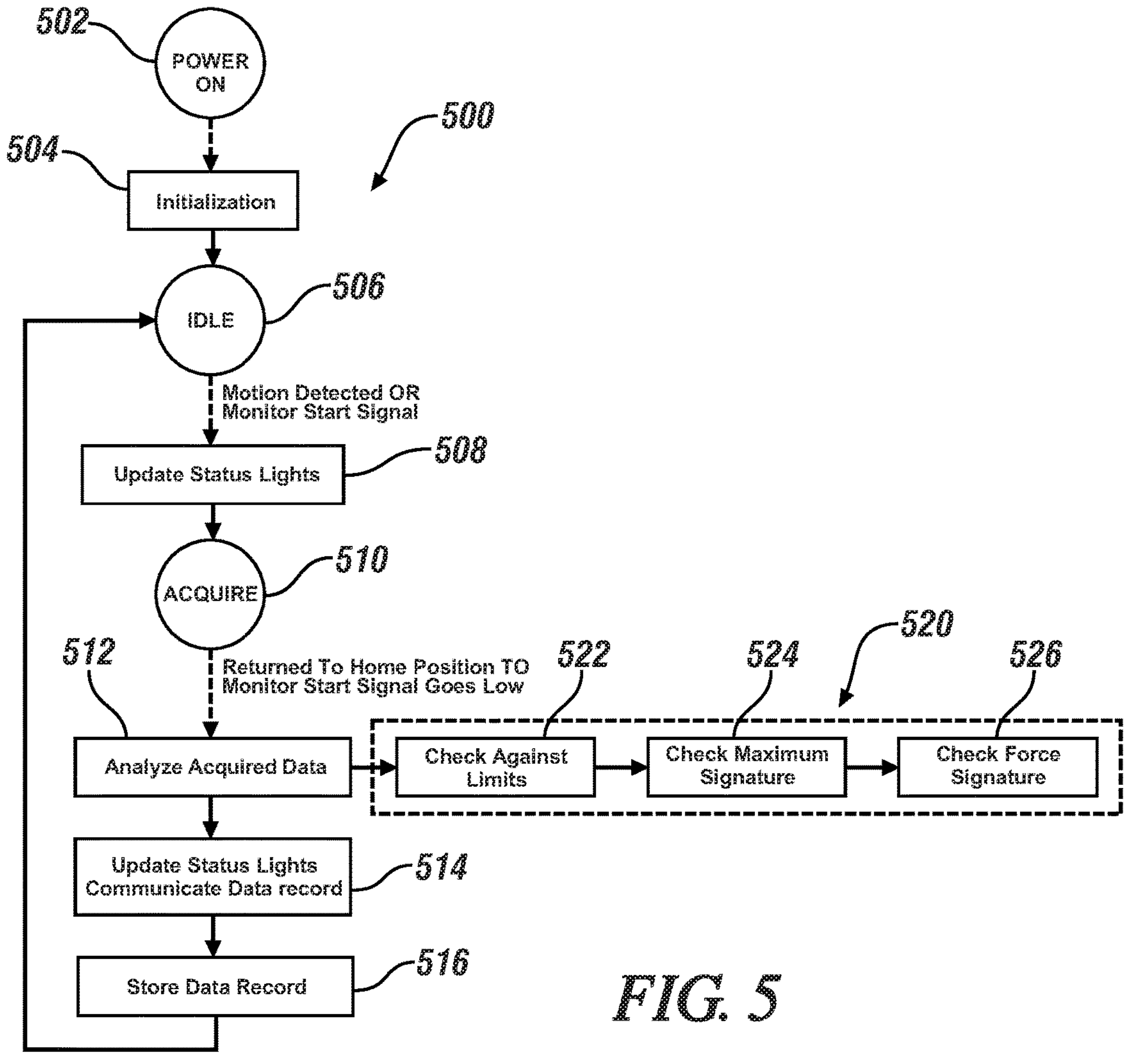
FIG. 5 schematically shows an algorithmic flowchart that may be executed to monitor an embodiment of a press frame assembly, in accordance with the disclosure.

FIG. 5 schematically shows a routine 500 that includes monitoring operation of an embodiment of the press frame assembly 100 described hereinabove. Table 2 is provided as a key wherein the numerically labeled blocks and the corresponding functions are set forth as follows, corresponding to the routine 500. The teachings may be described herein in terms of functional and/or logical block components and/or various processing steps. It should be realized that such block components may be composed of hardware, software, and/or firmware components that have been configured to perform the specified functions.

TABLE 2

| BLOCK | BLOCK CONTENTS |
|---|---|
| 502 | Power on |
| 504 | Initialization |
| 506 | Monitor to detect activation |
| 508 | Update status lamp (illuminate visual indicator 52) |
| 510 | Acquire cycle data |
| 512 | Analyze cycle data |
| 514 | Update status lamp and Communicate data |
| 516 | Store analyzed data |
| 520 | Data Analysis |
| 522 | Compare cycle data to predetermined limits |
| 524 | Check maximum displacement |
| 526 | Check force signature |

Execution of the routine 500 may proceed as follows. The steps of the routine 500 may be executed in a suitable order, and are not limited to the order described with reference to FIG. 5. As employed herein, the term "1" indicates an answer in the affirmative, or "YES", and the term "0" indicates an answer in the negative, or "NO". Upon receiving a power-on signal (502), the routine 500 initializes, which may include resetting any data registers and conducting any form of self-testing, such as verifying that data inputs are in-range and executing any communication protocol initializations. The routine 500 monitors operation to detect activation (506), such as detecting onset of a cycle event via the load cell 20 and/or the linear displacement transducer 42, or via a signal that is communicated from an outside source, e.g., an activation command from the mechanical press 200. Upon activation of a cycle, a status lamp is updated, e.g., by illuminating the visual indicator 52 (508) and data is monitored and acquired from the load cell 20 and/or the linear displacement transducer 42 throughout the cycle (510). At the end of the cycle, the acquired data is analyzed (512), and communicated (514) which can include updating the status lamp, e.g., by turning off the visual indicator 52 (514), and the analyzed data is stored in a memory device (516), and the controller 50 awaits activation of the next cycle (506). Communicating the acquired data (514) may include, in addition or in the alternative, communicating the acquired data via the communication link 55 to a second device, such as a second controller.

Data analysis (520) can include, in one embodiment, comparing the acquired data to preset maximum or minimum load and/or linear displacement limits (522), determining a maximum or minimum depth of linear penetration (524), and evaluating the load signature during the cycle (526). This may further include providing visual communication via the visual indicator 52 to indicate when a target force, position, elapsed time or another condition has been achieved during each iteration. Alternatively, or in addition, this may include providing another form of communication via another indicator to indicate when a target force, position, elapsed time or another condition has been achieved during each iteration, wherein such indicators may be auditory, haptic, etc.

The routine 500 that is described with reference to FIG. 5 includes a flow chart illustrating an example method of a computing system receiving instructions from one or more modules in communication with the system. The computing system communicating with the one or more modules may be implemented through a computer algorithm, machine executable code, non-transitory computer-readable medium, or software instructions programmed into a suitable programmable logic device(s), such as the one or more modules, a remotely located server in communication with the computing system, a mobile device communicating with the computing system and/or server, another controller, or a combination thereof. Although the various steps shown in the flowchart diagram appear to occur in a chronological sequence, at least some of the steps may occur in a different order, and some steps may be performed concurrently or not at all.

Figure 6:
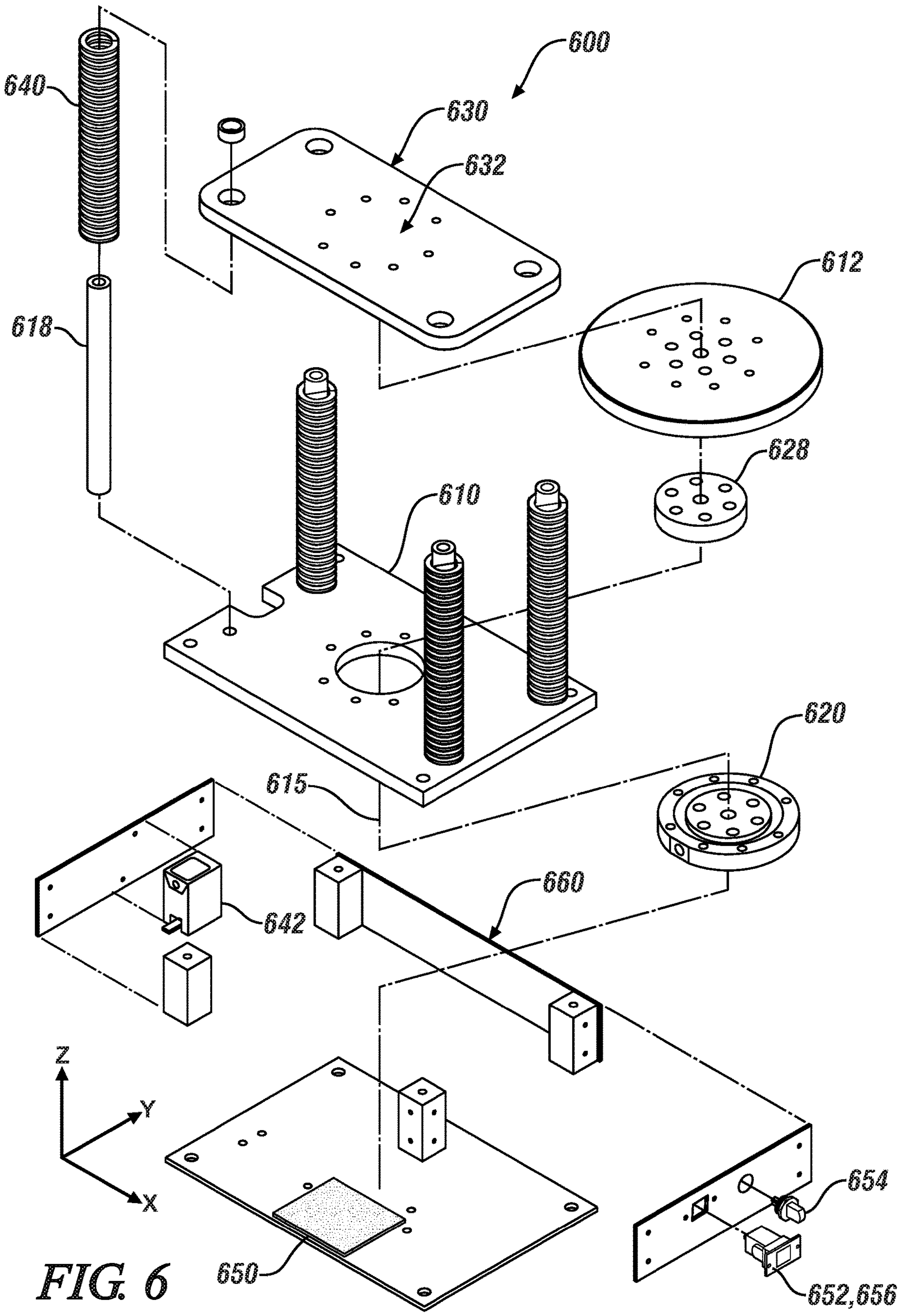
FIG. 6 schematically illustrates an exploded isometric view of an embodiment of a press frame assembly, in accordance with the disclosure.
Figure 7:
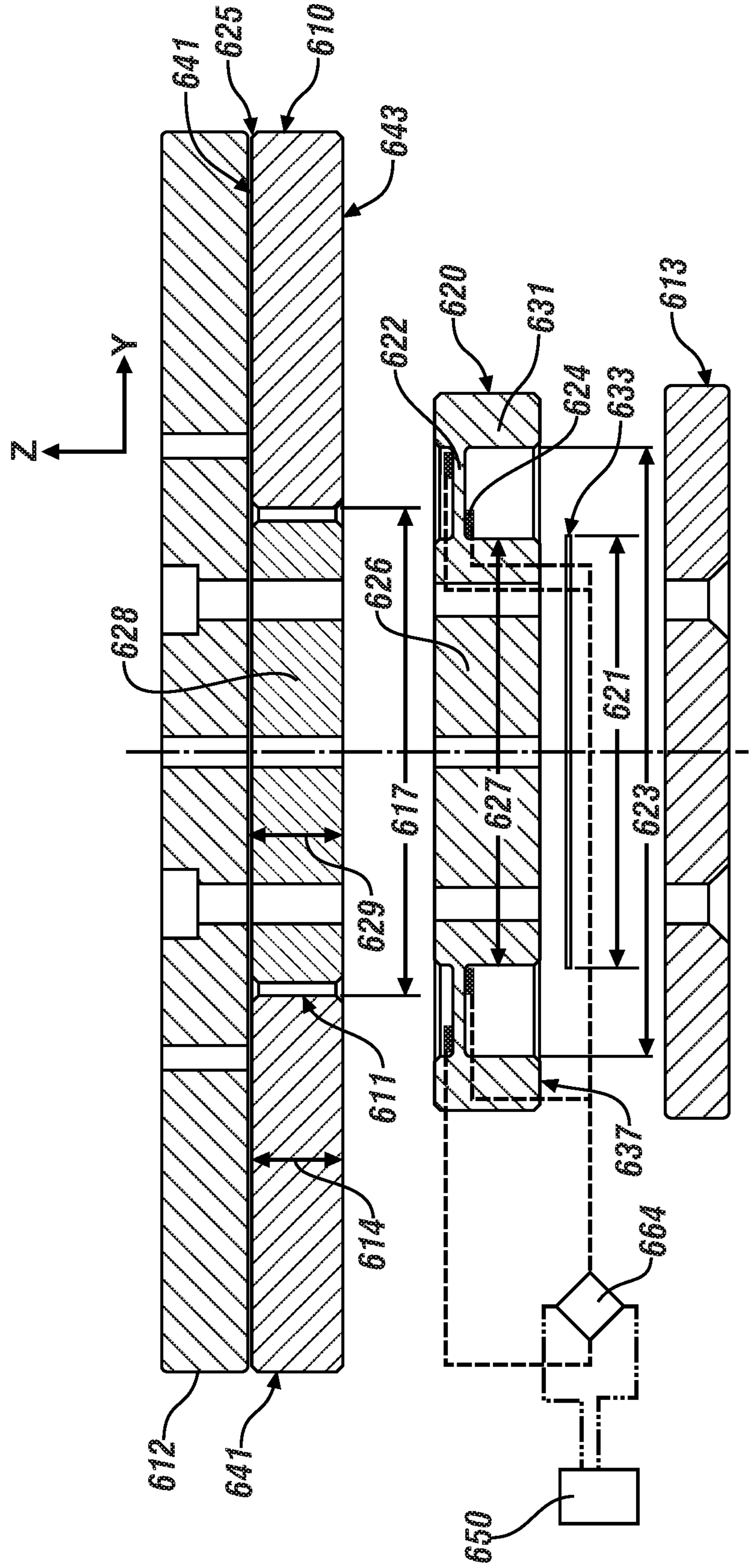
FIG. 7 schematically illustrates a cutaway side-view of a portion of a base of an embodiment of a press frame assembly, in accordance with the disclosure.

FIGS. 6 and 7 schematically show another embodiment of a press frame assembly 600, wherein operation of the press frame assembly 600 may be controlled by a controller 650 in a manner that is consistent with the routine 500 that is described with reference to FIG. 5. The press frame assembly 600 includes a base 610, a load cell 620, a first, upper plate 630 that includes a first press-tool mount 632, a second press-tool mount in the form of a compression overload protection plate 612, a spacer 628, vertically-oriented guide-posts 618, springs 640, a linear displacement transducer 642, controller 650, an electrical power connector 656, an electrical communication connector 654, and a visual indicator 652. In this embodiment, the load cell 620 is a separate device that is fixedly attached to a lower portion of the base 610. A lower portion of the press frame assembly 600 includes the base 610 and a cover 660, which cooperate to define a cavity in which the controller 650 is housed. The base 610 also provides apertures and mounting for the electrical power connector 656, the electrical communication connector 654 and the visual indicator 652, which is a lamp in one embodiment. Details of the press frame assembly 600 are described with reference to a three-dimensional coordinate system that includes an X-axis, a Y-axis and a Z-axis to provide a frame of reference, and corresponding X-, Y-, and Z-dimensions. The electrical communication connector 654 is in communication with the controller 650 and may be compatible with one or multiple communication protocols, including, e.g., Ethernet and/or EtherCAT protocols. The electrical power connector 656 may electrically connect to a low-voltage power source to supply electric power to operate the controller 650. The electrical communication connector 654 and the electrical power connector 656 may be configured in a single connector in one embodiment.

FIG. 7 schematically shows a cross-sectional side-view of portions of this embodiment of the press frame assembly 600 including the base 610, load cell 620, compression overload protection plate 612, spacer 628, shim 633, and tension overload protection plate 613 that are arranged in a stacked configuration relative to the Z-axis. One embodiment of the press frame assembly 600 may include the base 610, load cell 620, compression overload protection plate 612, and spacer 628 coaxially arranged in a stacked configuration relative to the Z-axis. One embodiment of the press frame assembly 600 may include the base 610, load cell 620, shim 633, and tension overload protection plate 613 that are arranged in a stacked configuration relative to the Z-axis.

The base 610 may be arranged as a rectangular prism that may be fabricated from a flat block of steel or other hardened metal, and includes a centrally disposed through aperture 611 that is in the XY plane, a first, upper surface 641, and a second, lower surface 643. The base 610 has a first thickness 615 in the Z-dimension. The aperture 611 is disc-shaped in one embodiment, and defines an aperture diameter 617 that is designed to accommodate the spacer 628.

The load cell 620 is arranged as a disc-shaped element including an outer portion 631, an annularly-shaped flexure portion 622, and a disc-shaped beam 626. One or a plurality of load sensor(s) 624 are disposed on the flexure portion 622. The load sensor(s) 624 are arranged to measure the deflection in the beam 626.

The flexure portion 622 may be formed by machining an annular groove into an upper surface of the load cell 620 and machining a correspondingly-located annular groove into a lower side of the load cell 620, employing a mill or another metal cutting device. A Z-dimension thickness of the flexure portion 622 is uniform in the XY plane, in one embodiment. The Z-dimension thickness of the flexure portion 622 is selected based upon an expected magnitude of force being exerted upon the beam 626 and an expected deflection of the beam 626 in response to an expected magnitude of exerted force upon the beam 626 that occurs during cyclically-occurring loads, and also accounts for a linear range of load sensor(s) 624 that are disposed to measure the deflection in the beam 626.

The load cell 620 is fixedly secured to a lower side of the base 610 via fasteners (not shown), and is positioned such that the beam 626 is centered under the aperture 611 in the XY-orientation. The beam 626 defines a beam diameter 627. The flexure portion 622 defines a flexure diameter 623.

The beam 626 and flexure portion 622 of the load cell 620 are arranged coaxially with the aperture 611 of the base 610, with the beam diameter 627 being less than the aperture diameter 617, and the aperture diameter 617 being less than the flexure diameter 623.

The spacer 628 is a disc-shaped device that is inserted into the aperture 611 of the base 610, and has an outside diameter that is slightly less than the aperture diameter 617. The spacer 628 has a thickness 629 in the Z-dimension that is greater than the thickness 614 of the base 610, thus creating a first gap 625 between the base 610 and the compression overload protection plate 612 when in a relaxed state. The spacer 628 is precision-ground or otherwise formed to create the first gap 625 at a selected magnitude in the z-dimension.

When a compressive load is applied to the press frame assembly 600, it is transferred via the compression overload protection plate 612 to the beam 626 via the spacer 628, the magnitude of which is measured by the load sensor(s) 624 due to deflection of the flexure portion 622 of the load cell 620. The base 610 provides a mechanical stop to the overload protection plate 612 when the compressive load is sufficiently large to deflect the flexure portion 622 of the load cell 620 and close the first gap 625, thus preventing loading of the load cell 620 beyond its elastic limits or beyond its linear range of measurement.

In one embodiment, the tension overload protection plate 613 is secured to a lower side of the load cell 620 with a disc-shaped shim 633 interposed therebetween. The tension overload protection plate 613 is secured to the lower side of the load cell 620 with one or more fasteners that pass through the load cell 620, the spacer 628, the base 610, and are attached to the compression overload protection plate 612, which is attached to a portion of a press-assembly tool (not shown).

The tension overload protection plate 613 is a disc-shaped device that has an outside diameter that is substantially equal to the outside diameter of the load cell 620, and the disc-shaped shim 633 has an outside diameter 621 that is substantially equal to the diameter 627 of the beam 626. The interposed shim 633 creates a second gap 637 between the beam 626 and the tension overload protection plate 613.

When a tension load is applied by the press frame assembly 600, that load is transferred to the beam 626 via the fasteners, the tension overload protection plate 613, and the shim 633. The magnitude of the load is measured by the load sensor(s) 624 due to deflection of the flexure portion 622 of the load cell 620. The load cell 620 provides a mechanical stop to the tension overload protection plate 613 when the tension load is sufficiently large to deflect the flexure portion 622 of the load cell 620 and close the second gap 637, thus preventing loading of the load cell 620 beyond its elastic limits or beyond its linear range of measurement.

The following Clauses provide example configurations of a press frame assembly, as disclosed herein.

Clause 1: A press frame assembly, comprising: a base plate, including a first press-tool mount, a load cell, and an overload protection element; a first plate, including a second press-tool mount, wherein the first plate defines a first plane that is arranged in parallel to a second plane defined by the base plate; a plurality of guideposts disposed on the base plate; a plurality of springs disposed on the plurality of guideposts; a displacement transducer, wherein the displacement transducer is arranged to monitor a linear displacement of the first plate in relation to the base plate; and a controller, in communication with the load cell and the displacement transducer; wherein the first plate is disposed to translate on the plurality of guideposts, and wherein the springs are disposed to urge movement of the first plate in relation to the base plate; wherein the load cell is arranged to monitor a load exerted upon the base plate; and wherein the controller generates a signal, wherein the signal is based upon at least one of the load exerted upon the base plate or the linear displacement of the first plate in relation to the base plate.

Clause 2. The press frame assembly of clause 1, further comprising an electrical connector in communication with the controller, wherein the controller is configured to monitor signal outputs from the displacement transducer and the load cell and communicate a signal to the electrical connector based thereon.

Clause 3. The press frame assembly of any of clauses 1-2, further comprising a visual indicator in communication with the controller, wherein the controller is arranged to activate the visual indicator based upon at least one of the load exerted upon the base plate by the translation of the first plate and the linear displacement of the first plate in relation to the base plate.

Clause 4. The press frame assembly of any of clauses 1-3, wherein the first press-tool mount of the base plate and the second press-tool mount of the first plate are arranged to mount a press-assembly tool.

Clause 5. The press frame assembly of any of clauses 1-4, wherein the press-assembly tool includes first and second elements, wherein the first press-tool mount of the base plate is configured to mount the first element of the press-assembly tool, and wherein the second press-tool mount of the first plate is configured to mount the second element of the press-assembly tool.

Clause 6. The press frame assembly of any of clauses 1-5, wherein the displacement transducer comprises one of a resistive potentiometer, a linearly-variable differential transformer (LVDT), an inductive device, an encoder, or a laser device that is arranged to monitor a linear displacement of the first plate in relation to the base plate.

Clause 7. The press frame assembly of any of clauses 1-6, comprising: wherein the load cell comprises a beam portion and a flexure portion; and wherein the overload protection element is disposed on the beam of the load cell and arranged to overlap with the base plate.

Clause 8. The press frame assembly of any of clauses 1-7, comprising: wherein the beam portion and the flexure portion of the load cell are formed in the base plate; and wherein the overload protection element comprises a second press-tool mount and a shim interposed between the beam portion of the load cell and the second press-tool mount.

Clause 9. The press frame assembly of any of clauses 1-8, wherein the overload protection element is arranged to provide a mechanical stop to a deflection of the load cell in response to a compression force.

Clause 10. The press frame assembly of any of clauses 1-9, wherein the overload protection element is arranged to provide a mechanical stop to a deflection of the load cell in response to a tension force.

Clause 11. The press frame assembly of any of clauses 1-10, wherein the shim and the beam of the load cell cooperate with the base plate to define a maximum deflection of the load cell.

Clause 12. The press frame assembly of any of clauses 1-11, further comprising: the base plate including an aperture; and a spacer, inserted into the aperture formed in the base plate; wherein the spacer has a thickness that is greater than a thickness of the base plate.

Clause 13. The press frame assembly of any of clauses 1-12, comprising: wherein the load cell comprises a disc including a beam portion and a flexure portion; wherein the load cell is fixedly attached to a lower portion of the base plate and circumscribes the aperture; and wherein the overload protection element comprises a second press-tool mount disposed on an upper surface of the base plate including the spacer such that the spacer is interposed between the beam portion of the load cell and the second press-tool mount.

Clause 14. The press frame assembly of any of clauses 1-13, wherein the spacer and the beam of the load cell cooperate with the base plate to define a maximum deflection of the load cell.

Clause 15. The press frame assembly of any of clauses 1-14, wherein the load cell further comprises a plurality of transducers that are disposed on the flexure portion.

Clause 16. The press frame assembly of any of clauses 1-15, wherein the plurality of transducers comprise strain-gage transducers.

Clause 17. The press frame assembly of any of clauses 1-16, wherein the strain-gage transducers are electrically connected in a Wheatstone bridge arrangement.

Clause 18. The press frame assembly of any of clauses 1-17: comprising:

wherein the plurality of guideposts are disposed on the base plate and orthogonal to the second plane; wherein the first plate includes a plurality of through-holes corresponding to the guideposts; and wherein the guideposts are inserted into the plurality of through-holes.

Clause 19. The press frame assembly of any of clauses 1-18, wherein the press frame assembly is insertable into a mechanical press and configured to mount a press-assembly tool that is configured to act upon a workpiece.

Clause 20. The press frame assembly of any of clauses 1-19, comprising: wherein the controller includes a memory device; wherein the controller is configured to monitor signal outputs from the load cell and the displacement transducer during each iteration of an assembly cycle; wherein the controller includes an instruction set, the instruction set executable to: analyze the signal outputs from the load cell and the displacement transducer during each iteration of the assembly cycle, store the analyzed signal outputs, and communicate the analyzed signal outputs to a second device.

Clause 21. The press frame assembly of any of clauses 1-20, wherein the mechanical press includes a linear actuator disposed to exert a displacement force on the first press-tool mount.

Clause 22. The press frame assembly of any of clauses 1-21, wherein the linear actuator is disposed to exert a compression displacement force on the first press-tool mount.

Clause 23. The press frame assembly of any of clauses 1-22, wherein the linear actuator is disposed to exert a tension force on the first press-tool mount.

Clause 24. The press frame assembly of any of clauses 1-23, wherein the load cell disposed to monitor load exerted upon second press-tool mount by the mechanical press further comprises the load cell disposed to monitor load exerted upon the workpiece.

Clause 25. A press frame assembly, comprising: a first plate, including a second press-tool mount; a base plate, including a first press-tool mount, a load cell, and an overload protection element; a plurality of guideposts disposed on the base plate and arranged to guide translation of the first plate in relation to the base plate; and a displacement transducer, arranged to monitor the translation of the first plate in relation to the base plate; wherein the load cell is arranged to monitor a load exerted upon the base plate that is associated with the translation of the first plate in relation to the base plate.

Clause 26. The press frame assembly of any of clauses 25, further comprising: a controller in communication with the load cell and the displacement transducer; wherein the controller generates a signal, wherein the signal is based upon at least one of the load exerted upon the base plate or the translation of the first plate in relation to the base plate.

Clause 27. The press frame assembly of any of clauses 25-26, further comprising the press frame assembly insertable into a mechanical press and configured to mount a press-assembly tool, wherein the load cell is arranged to monitor a load exerted upon the base plate by operation of the mechanical press.

The concepts described herein may be advantageously employed in manufacturing assembly and/or test to determine and/or insure proper press-fit assembly quality or part functionality. Assembly quality considerations may include, by way of non-limiting example, a maximum or minimum press-fit force, a maximum or minimum press depth, a measurement of force realized at a distance relative to maximum press depth, or a force/position profile. The controller can be configured to determine parameters associated with process capability and workpiece quality by reading inputs from the sensors and keeps a continuous part record of every part that is produced. The customer can query and report this record at any time or choose to integrate this into a quality management system. The concepts provide simplified/off-line setup and teardown that can be employed to reduce manufacturing downtime associated with tooling changes. The concepts provide for feedback from each assembly stroke, including pressure and distance/stroke, e.g., related to accuracy, precision, consistency, for quality control and scheduled maintenance of tooling. The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A press frame assembly, comprising:

a first plate, including a first press-tool mount, wherein the first plate defines a first plane that is arranged in parallel to a second plane defined by a base plate;

the base plate including a second press-tool mount, a load cell, and an overload protection element, the base plate having an aperture formed therein;

a spacer inserted into the aperture formed in the base plate, wherein the spacer has a thickness that is greater than a thickness of the base plate;

a plurality of guideposts disposed on the base plate;

a plurality of springs disposed on the plurality of guideposts;

a displacement transducer, wherein the displacement transducer is arranged to monitor a linear displacement of the first plate in relation to the base plate; and a controller, in communication with the load cell and the displacement transducer;

wherein the first plate is disposed to translate on the plurality of guideposts, and wherein the springs are disposed to urge movement of the first plate in relation to the base plate;

wherein the load cell is arranged to monitor a load exerted upon the base plate;

wherein the load cell includes a beam portion and a flexure portion;

wherein the controller generates a signal, wherein the signal is based upon at least one of the load exerted upon the base plate or the linear displacement of the first plate in relation to the base plate;

wherein the press frame assembly is a portable self-contained unit that is removably insertable into a mechanical press; and wherein the overload protection element is disposed on the beam portion of the load cell and arranged to overlap with the base plate.

2. The press frame assembly of claim 1, further comprising an electrical connector in communication with the controller, wherein the controller is configured to monitor signal outputs from the displacement transducer and the load cell and communicate a signal to the electrical connector based thereon.

3. The press frame assembly of claim 1, further comprising a visual indicator in communication with the controller, wherein the controller is arranged to activate the visual indicator based upon at least one of the load exerted upon the base plate by the translation of the first plate and the linear displacement of the first plate in relation to the base plate.

4. The press frame assembly of claim 1, wherein the second press-tool mount of the base plate and the first press-tool mount of the first plate are arranged to mount a press-assembly tool.

5. The press frame assembly of claim 4, wherein the press-assembly tool includes first and second elements, wherein the second press-tool mount of the base plate is configured to mount the first element of the press-assembly tool, and wherein the first press-tool mount of the first plate is configured to mount the second element of the press-assembly tool.

6. The press frame assembly of claim 1, wherein the displacement transducer comprises one of a resistive potentiometer, a linearly-variable differential transformer (LVDT), an inductive device, an encoder, or a laser device that is arranged to monitor a linear displacement of the first plate in relation to the base plate.

7. The press frame assembly of claim 1:

wherein the beam portion and the flexure portion of the load cell are formed in the base plate; and wherein the overload protection element comprises the second press-tool mount and a shim interposed between the beam portion of the load cell and the second press-tool mount.

8. The press frame assembly of claim 7, wherein the overload protection element is arranged to provide a mechanical stop to a deflection of the load cell in response to a compression force.

9. The press frame assembly of claim 7, wherein the overload protection element is arranged to provide a mechanical stop to a deflection of the load cell in response to a tension force.

10. The press frame assembly of claim 7, wherein the shim and the beam of the load cell cooperate with the base plate to define a maximum deflection of the load cell.

11. The press frame assembly of claim 1:

wherein the load cell comprises a disc including a beam portion and a flexure portion;

wherein the load cell is fixedly attached to a lower portion of the base plate and circumscribes the aperture; and wherein the overload protection element comprises the second press-tool mount disposed on an upper surface of the base plate including the spacer such that the spacer is interposed between the beam portion of the load cell and the second press-tool mount.

12. The press frame assembly of claim 11, wherein the spacer and the beam portion of the load cell cooperate with the base plate to define a maximum deflection of the load cell.

13. The press frame assembly of claim 1, wherein the load cell further comprises a plurality of transducers that are disposed on the flexure portion.

14. The press frame assembly of claim 13, wherein the plurality of transducers comprises strain-gage transducers.

15. The press frame assembly of claim 1:

wherein the plurality of guideposts are disposed on the base plate and orthogonal to the second plane;

wherein the first plate includes a plurality of through-holes corresponding to the guideposts; and wherein the guideposts are inserted into the plurality of through-holes.

16. The press frame assembly of claim 1, wherein the press frame assembly is configured to mount a press-assembly tool that is configured to act upon a workpiece.

17. The press frame assembly of claim 16, wherein the mechanical press includes a linear actuator disposed to exert a displacement force on the first press-tool mount.

18. The press frame assembly of claim 17, wherein the linear actuator is disposed to exert a tension force on the first press-tool mount.

19. The press frame assembly of claim 17, wherein the load cell is disposed to monitor load exerted upon the second press-tool mount by the mechanical press to monitor a load exerted upon the workpiece.

20. The press frame assembly of claim 1, further comprising:

wherein the controller includes a memory device;

wherein the controller is configured to monitor signal outputs from the load cell and the displacement transducer during each iteration of an assembly cycle;

wherein the controller includes an instruction set stored in the memory device, the instruction set executable to:

analyze the signal outputs from the load cell and the displacement transducer during each iteration of the assembly cycle, store the analyzed signal outputs in the memory device, and communicate the analyzed signal outputs to a second device.

* * * * *